(12) United States Patent
Povoa

(10) Patent No.: US 11,695,619 B2
(45) Date of Patent: Jul. 4, 2023

(54) SYSTEM AND METHOD FOR ROOT CAUSE ANALYSIS OF CALL FAILURES IN A COMMUNICATION NETWORK

(71) Applicant: T-Mobile USA, Inc., Bellevue, WA (US)

(72) Inventor: Marcelo Povoa, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 729 days.

(21) Appl. No.: 16/784,441

(22) Filed: Feb. 7, 2020

(65) Prior Publication Data

US 2020/0259701 A1 Aug. 13, 2020

Related U.S. Application Data

(60) Provisional application No. 62/802,334, filed on Feb. 7, 2019.

(51) Int. Cl.
| | |
|---|---|
| *H04L 41/0631* | (2022.01) |
| *H04L 41/0654* | (2022.01) |
| *G06F 11/07* | (2006.01) |
| *G06Q 10/0639* | (2023.01) |
| *H04W 28/04* | (2009.01) |
| *G06N 20/00* | (2019.01) |
| *G06F 16/242* | (2019.01) |
| *G05B 23/02* | (2006.01) |

(52) U.S. Cl.
CPC ...... *H04L 41/0645* (2013.01); *G05B 23/0281* (2013.01); *G06F 11/079* (2013.01); *G06F 16/244* (2019.01); *G06N 20/00* (2019.01); *G06Q 10/06393* (2013.01); *H04L 41/0654* (2013.01); *H04W 28/04* (2013.01)

(58) Field of Classification Search
CPC ............ H04L 41/0645; H04L 41/0654; G06Q 10/06393; H04W 28/04; G06F 11/079; G06F 16/244; G05B 23/0281; G06N 20/00
See application file for complete search history.

(56) References Cited

U.S. PATENT DOCUMENTS

| | | | |
|---|---|---|---|
| 11,138,168 B2* | 10/2021 | Purushothaman | ...... H04L 43/16 |
| 2019/0239100 A1* | 8/2019 | Pandey | .................. G06N 20/00 |
| 2020/0052981 A1* | 2/2020 | Pandey | .................. H04L 43/50 |

\* cited by examiner

*Primary Examiner* — Azizul Choudhury
(74) *Attorney, Agent, or Firm* — Loeb & Loeb LLP

(57) ABSTRACT

The claimed system and method describes a root cause analysis system for a radio access network. Some aspects include automatic identification of possible causes for network issues, their ranking, determination of the root (main) cause and execution of related best actions, alerts and reporting in order to automatically identify, mitigate or eliminate the problem.

20 Claims, 14 Drawing Sheets

FIG. 8

Neighbor Down (intra)

410

Supported vendor-tech: All

Comment:

Logic (Correlator node):
- cell_neighbor_atts = for source cell, get neighbor+attempts information in [neighbor_atts_inter] from the last 3 days
- Aggregate cell_neighbor_atts in order to have one neighbor + AVG[attempts]
- Filter cell_neighbor_atts based on attempts by removing neighbors with attempts < 5% of total attempts
- cell_neighbor_avail = for all neighbors in cell_neighbor_atts, get their availability from [cell_availability]
- For each neighbor in cell_neighbor_avail:
  * neighbor_down = (neighbor_availability < 90)
- Result (per cell) = neighbor_down list including [neighbor name + attempts + attempts % + availability]

Data sources (Aggregator nodes):
- cell_availability
  * Get cell availability from PM KPIs
    - LTE: LTE_Cell_Availability
    - UMTS: UMTS Cell Availability
- neighbor_atts_inter
  * Description: Cell intra-frequency neighbors and their handover attempts
  * Details: Retrieve the attempt counter for each neighbor (for each source cell, it will have the neighbor+attempts).

FIG. 9

Neighbor Down (inter)

410

Supported vendor+tech: All

Comment:

Logic (Correlator node):
- cell_neighbor_atts = for source cell, get neighbor+attempts information in [neighbor_atts_inter] from the last 3 days
- Aggregate cell_neighbor_atts in order to have one neighbor + AVG[attempts]
- Filter cell_neighbor_atts based on attempts by removing neighbors with attempts < 5% of total attempts
- cell_neighbor_avail = for all neighbors in cell_neighbor_atts, get their availability from [cell_availability]
- For each neighbor in cell_neighbor_avail:
  * neighbor_down = (neighbor_availability < 90)
- Result (per cell) = neighbor_down list including [neighbor name + attempts + attempts % + availability]

Data sources (Aggregator nodes):
- cell_availability
  * Get cell availability from PM KPIs
    -- LTE: LTE_Cell_Availability
    -- UMTS: UMTS Cell Availability
- neighbor_atts_inter
  * Description: Cell inter-frequency neighbors and their handover attempts
  * Details: Retrieve the attempt counter for each neighbor (for each source cell, it will have the neighbor+attempts).

FIG. 10

Cell Down

- Supported vendor+tech: All
- Comment:
- Logic (Corelator node):
  - Cell is down if (cell_availability) < 90%
- Data sources (Aggregator nodes):
  - cell_availability
    * Get cell availability from PM KPIs
      - LTE: LTE_Cell_Availability
      - UMTS: UMTS Cell Availability

T-Brain: RF WINGMAN

Sort by: Category | Cell    Filters: Market | Site | Category

Categories — 1310
- ☐ Outages
- ☐ High Churn Cell
- ☐ High Unsatisfied Users
- ☐ High Garbled Call
- ☐ CM vs KPI Opportunities
- ☐ Limited Coverage
- ☐ Limited Capacity
- ☐ Overshooter
- ☐ KPI Anomaly
- ☐ T-Insights High DCR
- ☐ Power CM Change
- ☐ Mobility CM Change
- ☐ Traffic CM Change
- ☐ Misc CM Change
- ☐ Neighbor CM Change
- ☐ Tilt Changed
- ☐ HO Changed
- ☐ Major Alarm
- ☐ Minor Alarm
- ☐ Ops Ticket
- ☐ Events (e.g. sport)
- ☐ Severe weather

● Outages — 1320

| Cell | Type | Description | Action | Run |
|------|------|-------------|--------|-----|
| ● LNY01234A11 | Neighbor outage | The neighbor LNY04321B31 was down. | Run COC | > |
| ● LNY02211A21 | Outage | Sector is down | Run COC | > |

● Limited Capacity

| Cell | Type | Description | Action | Run |
|------|------|-------------|--------|-----|
| ● LNY01234A11 | Hardware limit | Number of users are reaching hardw... | Adjust totalNumb... | > |
| ● LNY02211A21 | Congestion | The number of simultaneous users | | |

● CM vs KPI Opportunities

| Cell | Type | Description | Expected Gain | Run |
|------|------|-------------|---------------|-----|
| ● LNY01234A11 | Reduce Leakage | Change parameter X from Y to Z | | > |
| ● LNY02211A21 | Improve DCR% | Change parameter W from K to L | -2% DCR | > |
| ● LNY01211A21 | Improve A&R% | Change parameter W from K to L | -5% AFR | > |

FIG. 13

SYSTEM AND METHOD FOR ROOT CAUSE ANALYSIS OF CALL FAILURES IN A COMMUNICATION NETWORK

CROSS-REFERENCE TO RELATED APPLICATIONS

This application claims priority to and the benefit of U.S. Patent Application 62/802,334, filed Feb. 7, 2019, entitled "SYSTEM AND METHOD FOR ROOT CAUSE ANALYSIS OF CALL FAILURES IN A COMMUNICATION NETWORK," the entire contents of which are incorporated herein by reference.

BACKGROUND

Root cause analysis (RCA) is often used to attempt to identify the origin of a problem. As part of the daily tasks of radio frequency (RF) engineers, it may be necessary to investigate what could be the cause for key performance indicators (KPI) fluctuations. For example, if the access failure increased, an engineer may need to manually investigate possible causes of the failures. In this case, RCA aims to answer the very challenging question of what causes daily radio access network (RAN) issues and act on them. At a high level, RCA may be broken down into a series of steps to find the primary cause of a problem. However, the amount of data in modern communication systems may be overwhelming and the raw data may lack the value that could be obtained from analyzing the data.

SUMMARY

The claimed system and method describes a root cause analysis (RCA) system for a radio access network (RAN). Some aspects include automatic identification of possible causes for network issues, their ranking, determination of the root (main) cause and execution of related best actions, alerts and reporting in order to automatically identify, mitigate or eliminate the problem. The system may be modular and may be easily expanded. As a result of the system architecture, multiple people may be able to work on different components without conflict, making it quite efficient for development.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 8 may be an illustration of a user interface showing how a problem has been addressed by the system;

FIG. 9 may be an illustration of data collected and reported by a node related to a neighbor down (intra-frequency);

FIG. 10 may be an illustration of data collected and reported by a node related to a neighbor down (inter-frequency);

FIG. 11 may be an illustration of data collected and reported by a node related to a cell being down;

FIG. 13 may be a sample illustration of problems in a network and how the problems are set to be addressed.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It may also be understood that the terms and expressions used herein are to be defined with respect to their corresponding respective areas of inquiry and study except where specific meanings have otherwise been set forth herein.

SPECIFICATION

Figure 1:
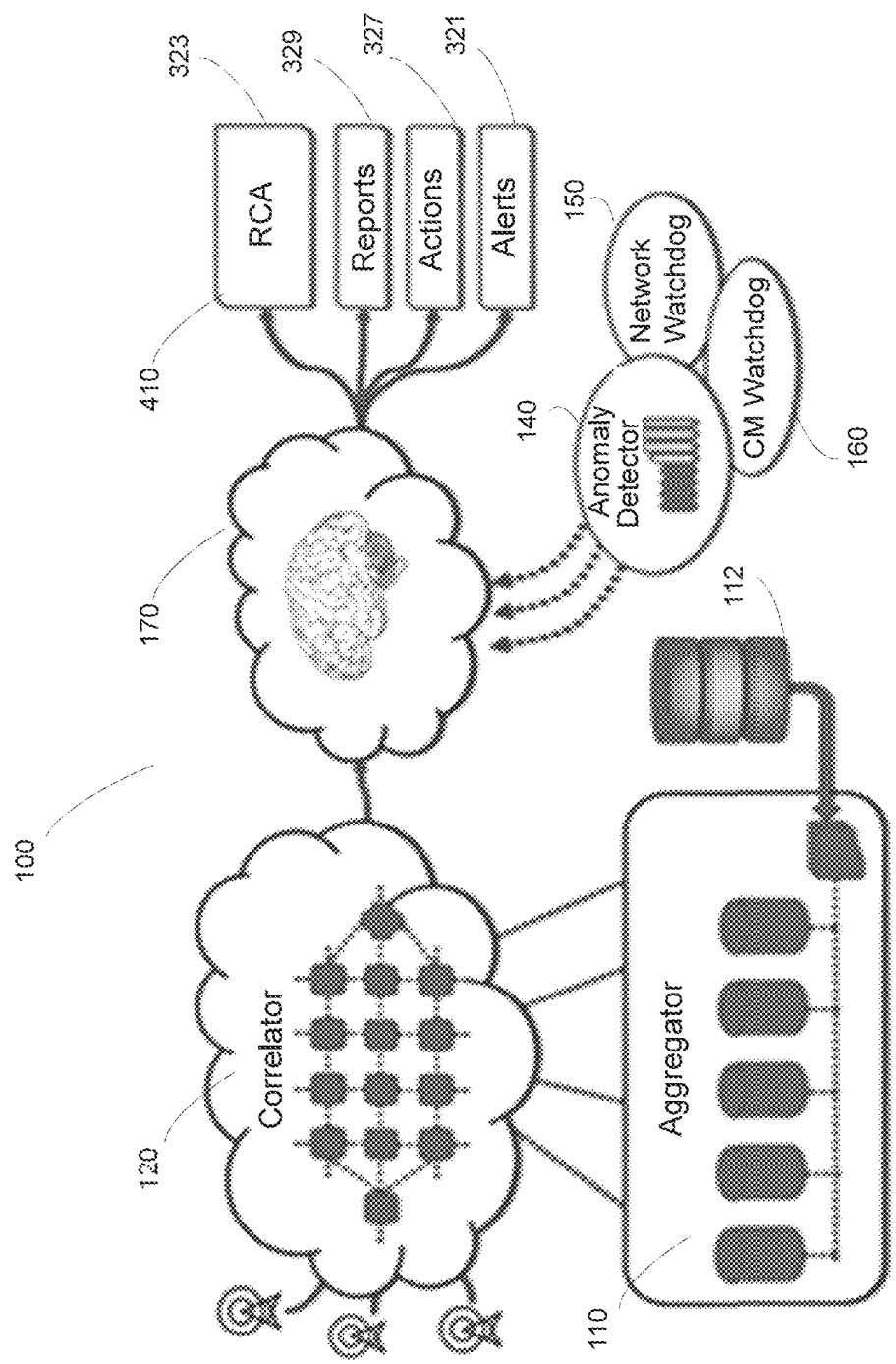
FIG. 1 may be a high level illustration of the root cause analysis system.

FIG. 1 may illustrate one embodiment of a system 100 for root cause analysis (RCA) of wireless network failures. Root cause analysis is often used to attempt to identify the origin of a problem. As part of the daily tasks of RF engineers, it may be necessary to investigate what could be the cause for key performance indicators (KPI) fluctuations. If the access failure increased, an engineer would need to manually investigate possible causes of the failures. The system 100 aims to answer the very challenging question of what causes daily radio access network (RAN) issues and act on the causes. At a high level, RCA may be broken down into a series of steps to find the primary cause of a problem. However, the amount of data in modern communication systems may be overwhelming and lack the value that could be obtained from the data if it was analyzed.

At a high level, the claimed system and method describes a root cause analysis for a radio access network (RAN). Some aspects include focusing on real and most common root cause analysis cases, having a system that may be easily expanded, estimates the root cause when several root cause may apply and may take actions. As a result of the system architecture, multiple people may be able to work on different components without conflict, making it quite efficient for development. With actions tied to the root cause analysis, the system is able to mitigate or eliminate problem automatically.

Root cause analysis is a systematic process for identifying "root causes" of problems or events and an approach for responding to them. Root cause analysis is based on the basic idea that effective management requires more than merely "putting out fires" for problems that develop, but finding a way to prevent them. Root cause analysis helps pinpoint contributing factors to a problem or event Root cause analysis helps organizations avoid the tendency to single out one factor to arrive at the most expedient (but generally incomplete) resolution. Root cause analysis also helps to avoid treating symptoms rather than true, underlying problems that contribute to a problem or event. While root cause analysis is used in a generic sense, there is an implication that a methodology is used in the analysis. Achievement of total prevention by a single intervention is not always possible and root cause analysis may be viewed as an ongoing process that strives for continuous improvement.

The primary goal of using root cause analysis is to analyze problems or events to identify:

What happened

How it happened

Why it happened . . . so that

Actions for preventing reoccurrence are developed

Identify barriers and the causes of problems, so that permanent solutions may be found.

Develop a logical approach to problem-solving, using data that already exists.

Establish repeatable, step-by-step processes, in which one process may confirm the results of another.

Referring again to FIG. 1, an aggregator 110 may be part of the system. The aggregator 110 may receive data on network anomalies from at least one network node 112. Network nodes 112 may take on a variety of forms. In some embodiments, the node 112 may be the controlling system for the cellular network. In other embodiments, network monitoring computers may be considered nodes 112, as well as any database with relevant data. Logically, the aggregator 110 may have a processor, a memory and an input output circuit to receive the electronic data from the nodes as described in FIG. 4. The input output circuit may be especially fast and efficient to handle the large amount of data that may flow to it.

Figure 4:
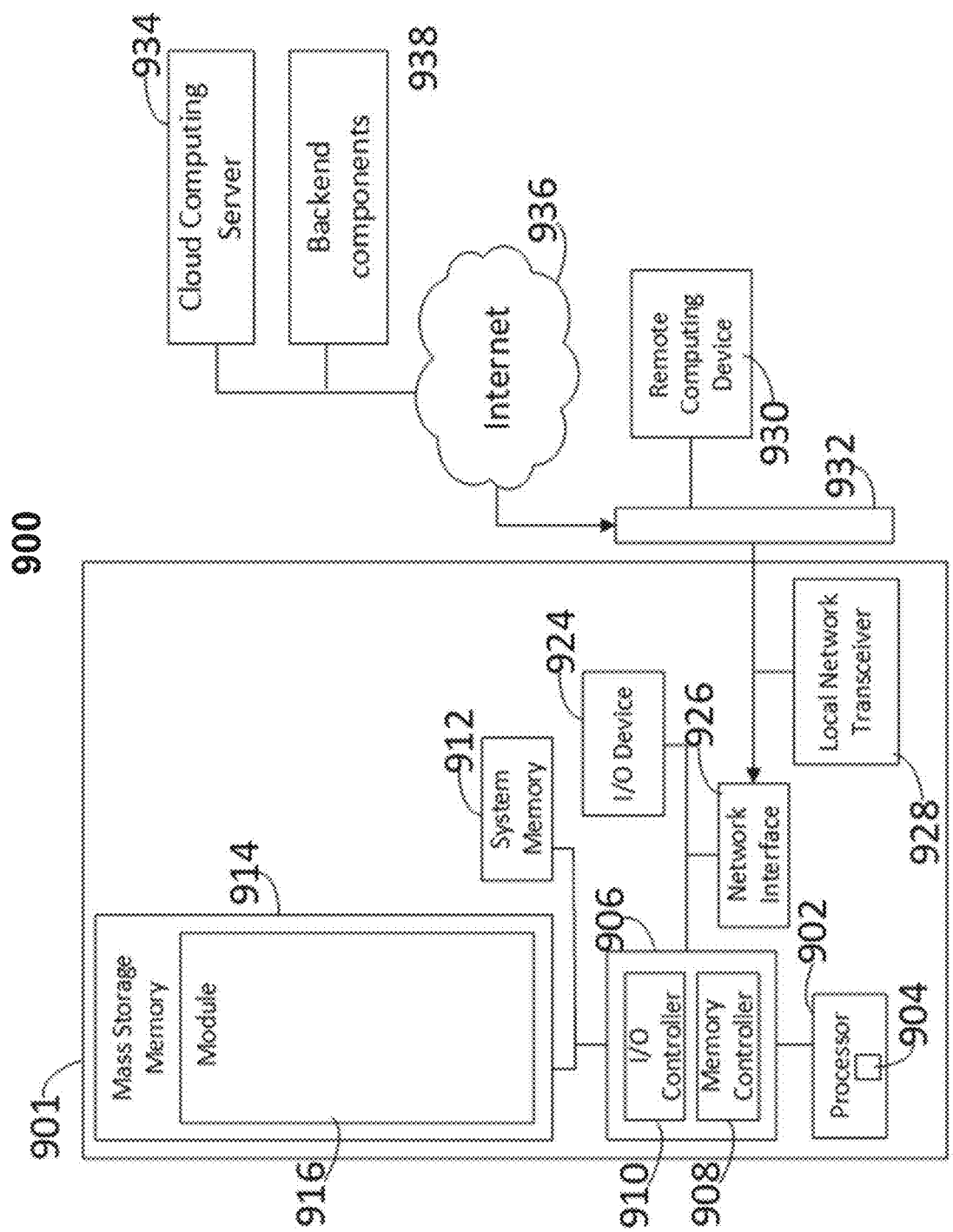
FIG. 4 may be an illustration of a sample computing device used by the system.

The nodes 112 may gather factual information about the network. Some sample nodes reports (and not limitations) may include data that may indicate a cell is down, that a cellular neighbor station may be down, that a cellular station may have limited capacity, that the tilt of an antenna may have changed, that a hand over list may have changed, that a new cell was activated nearby, that a return (RET) signal is missing, that a neighbor tilt has changed, that software has changed, etc. The nodes 112 may logically have a processor, a memory and an input output circuit to communicate the data such as illustrated in FIG. 4.

In some embodiments, the processor in the nodes 112 may be physically configured to analyze the data from the node 112 and format it according to a protocol or an API. In other embodiments, the nodes 112 may simply be sensors and may communicate readings, measurements, status, etc. which may be received and processed by the aggregator 110. The nodes 112 may also be thought of as elements of the root cause analysis system 100 and be useful in determining a root cause of a problem.

Figure 2:
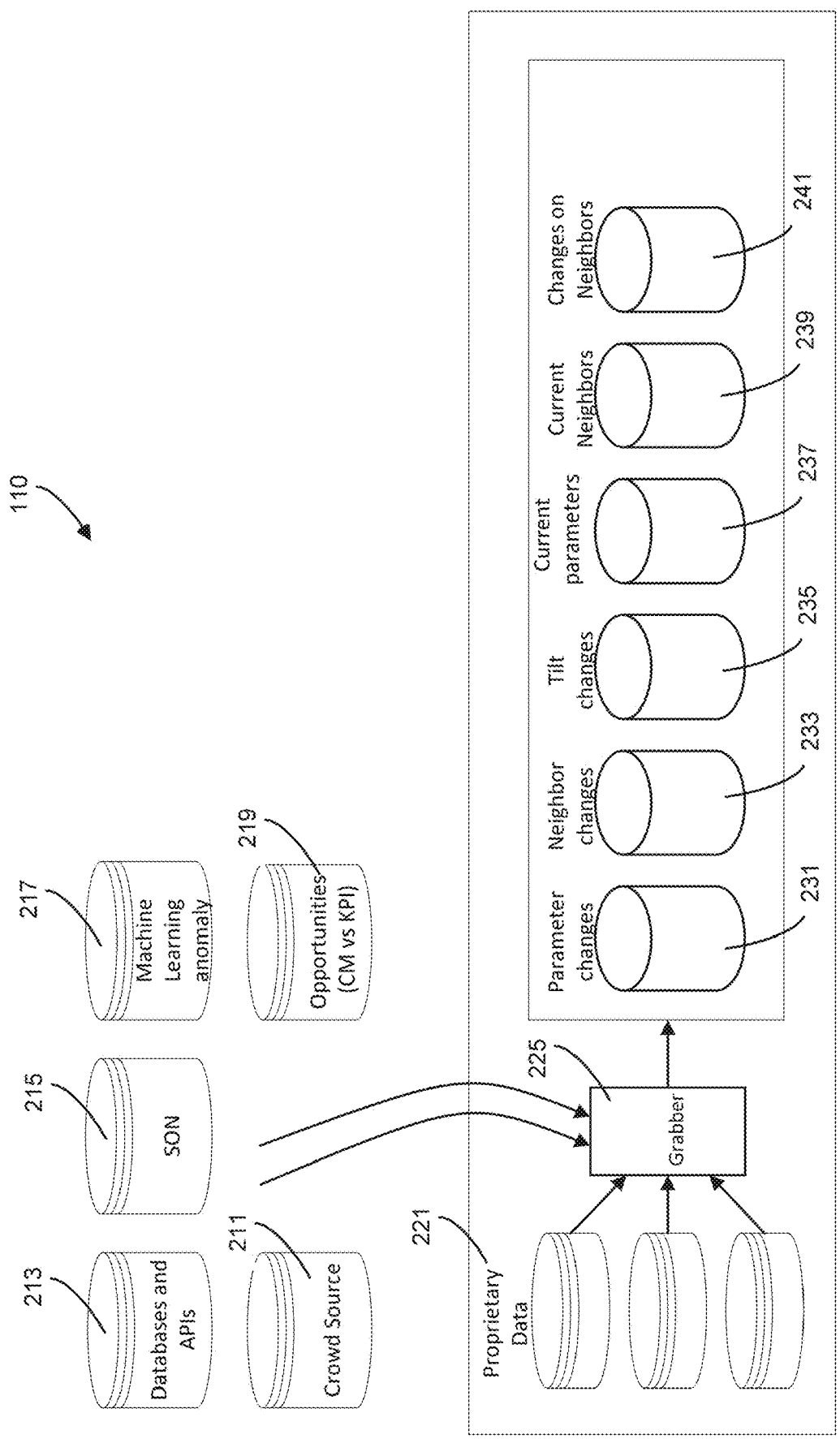
FIG. 2 may be an illustration of one embodiment of an aggregator.

FIG. 2 may illustrate a sample aggregator 110. As mentioned, the aggregator 110 may be designed to receive data from one or more data sources and periodically report it to the rest of the system 100 such as the correlator 130. The data may relate to performance of the network and may come from a variety of sources. Some data may come from crowd source data 211, outside databases and API called data 213, data from self-organizing networks (SON) 215, machine learning data 217 and opportunities data 219.

In some embodiments, the system 100 may also receive data that may be useful in self-organizing networks (SON) 215. For example, if a new network site is observed, a SON module may be executed to set up the network site. If there is severe weather, a SON module may be executed to address the likely weather impact. High cell churn may result in another SON module being executed. Similarly, an outage may indicate that another module should be started. The self-organizing network data 215 may be fed to the system to assist in troubleshooting or root cause analysis.

The aggregator 110 may have proprietary information/data 221 such as past issues with nodes and past fixes which may be network specific or network operator specific. The data may be stored in database such as by topic including parameter changes 231, neighbor changes 233, tilt changes 235, current parameters 237, current neighbors 239, changes of neighbors 241, etc. Of course, topics may be available and are contemplated.

Figure 3:
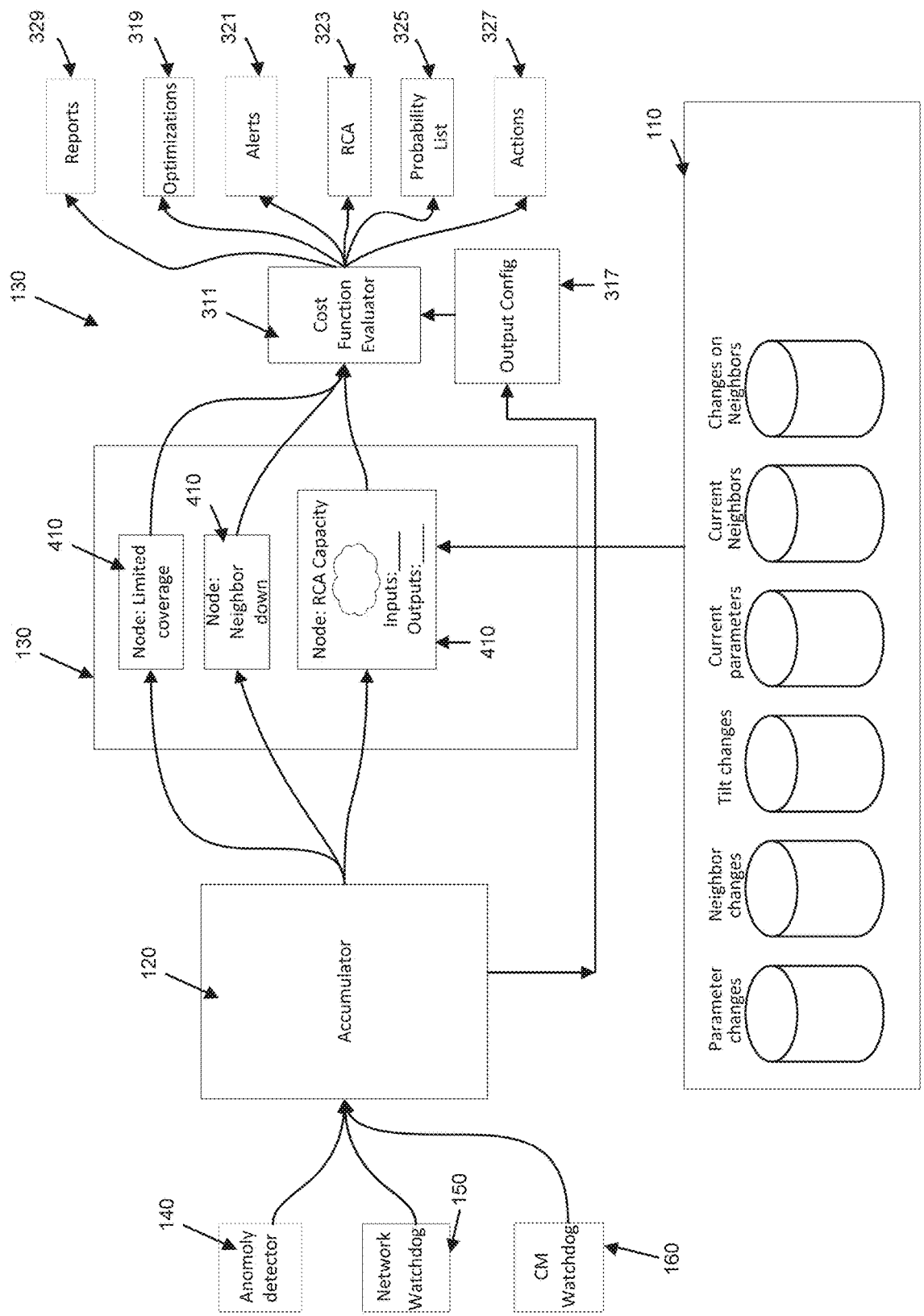
FIG. 3 may be an illustration of the system in more detail, including a perspective of multiple correlator nodes.

The system may also include a correlator 130 which may receive data on network issues. FIG. 3 may illustrate a sample system with correlator nodes 130. The correlator may attempt to correlate problems with solutions. The data on network issues may represent network status data and may come from one or more aggregators 110, an anomaly detector 140, a network watchdog 150 and a configuration manager (CM) watchdog 160 which may be part of the system 100. In some embodiments, data may also be received from a machine learning processor 170. In other embodiments, the machine learning processor 170 may be part of the correlators 130. The correlators 130 may include a processor, a memory and an input/output circuit as disclosed in FIG. 4. The processor may be physically configured with logic to analyze the data and make some determinations about the data such as what is the most likely cause of a particular problem on a network.

FIGS. 9-11 may illustrate sample correlator 120 and aggregator 110 nodes for data collection. The collection may include aggregator data 910 and correlator data 920. As mentioned previously, the aggregator data 910 may be more factual regarding events on the network while the correlator data may have logic applied to it which may analyze data and determine results based on the logic. For example, in FIG. 11, the data source for the aggregator data 910 may simply be whether a cell site is available at the current time while the correlator data 920 may make the determination based on the aggregator data 910 whether the cell has been down for more than 90% of the time which may indicate the cell is down.

Referring again to FIG. 1, in the embodiments where the machine learning processor 170 is a separate processor, the machine learning processor 170 may receive data from the correlator 130. The correlator 130 may have already performed some analysis on the data from the aggregator 110 and other network data sources as mentioned in reference to FIGS. 9-11.

More specifically, the machine learning processor 170 may receive additional data from a configuration management watchdog 160. The configuration management watchdog 160 may track configuration changes over time and may note when configuration changes have resulted in errors. The machine learning processor 170 may also receive notifications from a network watchdog 150. The network watchdog 150 may observe the network and note when obvious problems are occurring or when network performance has dropped.

The machine learning processor 170 may be physically configured to analyze the data to determine and select a most likely solution from a plurality of solutions based on past problems and previous solutions. For example, a particular problem may have a variety of possible causes with some causes being remote and other causes being more likely. The system may rank the likely causes and start by executing the most likely causes first.

Figure 6:
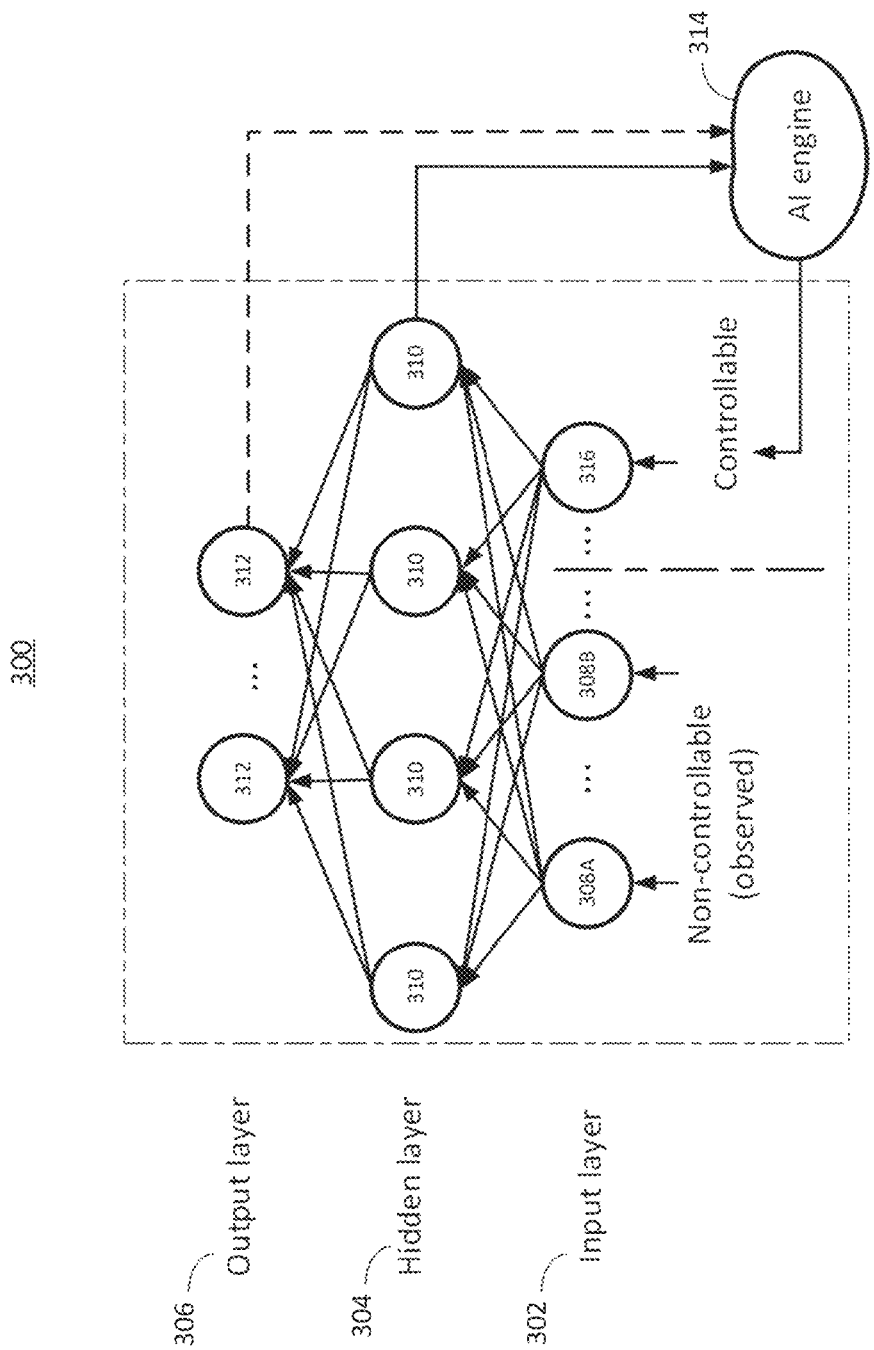
FIG. 6 may be an illustration of machine learning architecture.

With reference to FIG. 6, a machine learning (ML) architecture 300 may be used with the correlator 130 of system 100 in accordance with the current disclosure. In some embodiments, a machine learning module 170 may include instructions for execution on the processor that implement the machine learning architecture 300. The machine learning architecture 300 may include an input layer 302, a hidden layer 304, and an output layer 306. The input layer 302 may include inputs 308A, 308B, etc., coupled to the correlator 130 and represent those inputs that are observed from actual network related data. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous network problems and solutions. For example, the architecture 300 may be trained to determine root cause analysis to be associated with the problem data.

During training of the machine learning architecture 300, a dataset of inputs may be applied and the weights of the hidden layer 310 may be adjusted for the known outcome (e.g., a transaction analysis baseline) associated with that dataset. As more datasets are applied, the weighting accuracy may improve so that the outcome prediction is constantly refined to a more accurate result. In this case, the problem repository and/or the root cause respectively may including problems, solutions and outcome and may provide datasets for initial training and ongoing refining of the machine learning architecture 300.

Additional training of the machine learning architecture 300 may include an machine learning engine (AI engine) 314 providing additional values to one or more controllable inputs 316 so that outcomes may be observed for particular changes to the network related data. The values selected may represent different data types such as neighbor tilt, neighbor down, configuration changes and other alternative data presented at various points in the network with the network related data and may be generated at random or by a pseudo-random process. By adding controlled variables to the network related data, over time, the impact may be measured and fed back into the machine learning architecture 300 weighting to allow capture of an impact on a proposed change to the network in order to optimize the network. Over time, the impact of various different data at different points in the network may be used to predict an outcome for a given set of observed values at the inputs layer 302.

After training of the machine learning architecture 300 is completed, data from the hidden layer may be fed to the machine learning engine 314 to generate values for controllable input(s) 316 to optimize the root cause analysis. Similarly, data from the output layer may be fed back into the machine learning engine 314 so that the machine learning engine 314 may, in some embodiments, iterate with different data to determine via the trained machine learning architecture 300, whether the network related data is accurate, and other determinations.

Figure 8:
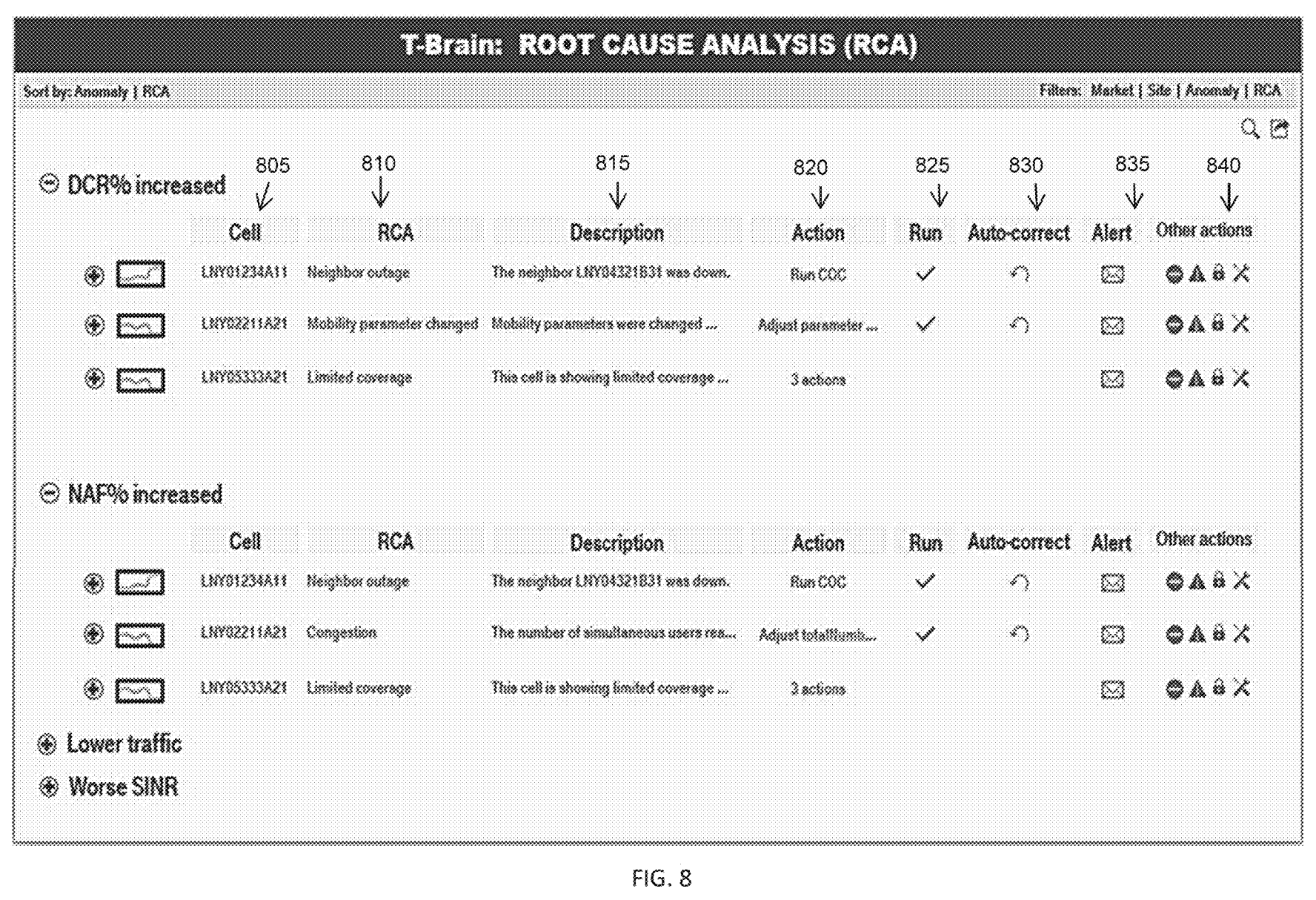
Figure 12:
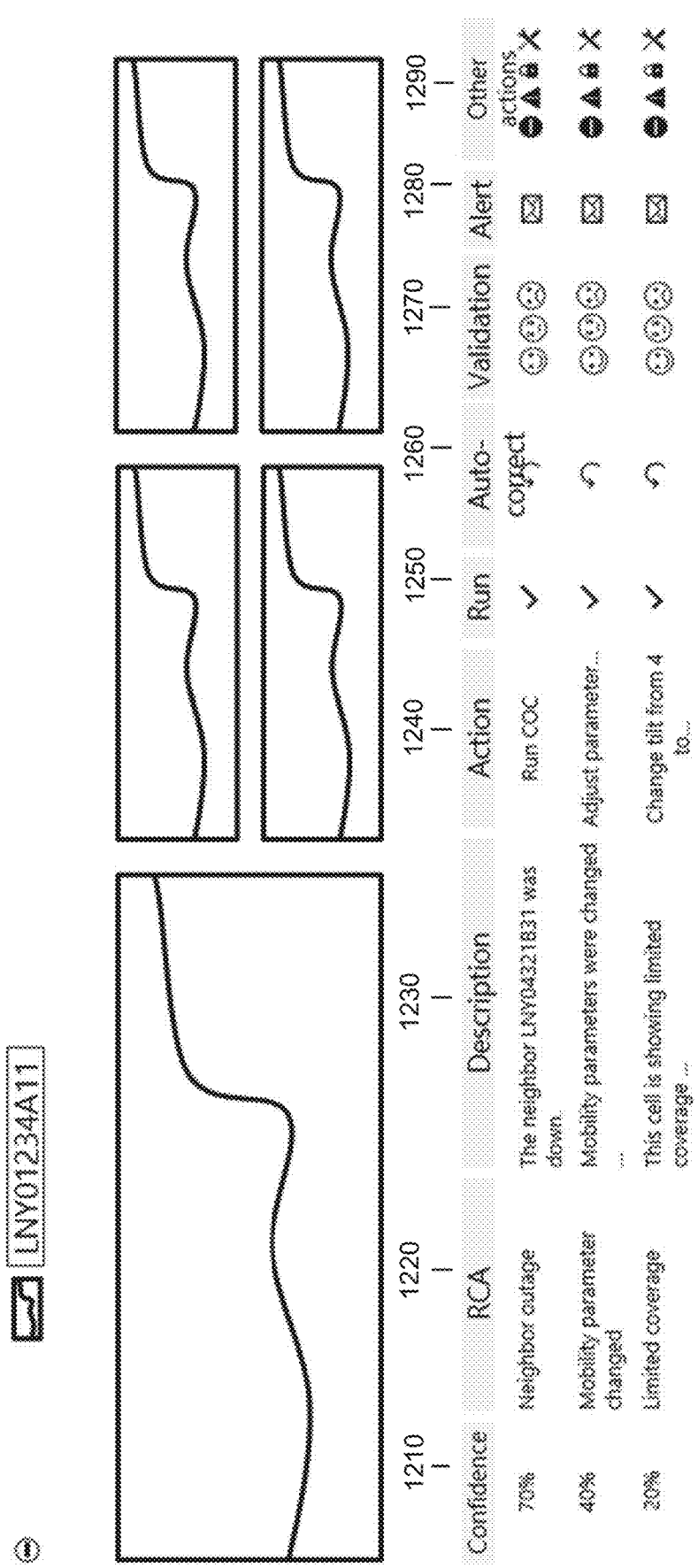
FIG. 12 may be an illustration of a user interface showing how a problem has been addressed by the system.

Referring to FIG. 1, the machine learning 170 may determine one or more root causes 323, create reports 329 such as in FIGS. 8, 12 and 13, may determine actions to take 327 and may determine whether alerts 321 are needed. As a result, network problems which had to be investigated by hand in the past without any assurance a solution was likely the root cause may now be attempted to be corrected automatically in a systematic fashion that attempts to address the root causes of the problems rather than the symptoms of a network problem.

With reference to FIG. 3, in other embodiments, the machine learning architecture 300 and machine learning engine 314 which may operate inside the machine learning module 170 may include a second instance of a machine learning architecture 400 and/or an additional node layer may be used. In some embodiments, a network analysis data layer 402 may determine an optimum root cause analysis 404 from observed inputs 404A, 404B. A analysis layer 406 with outputs 408A, 408B, etc., may be used to generate analysis recommendations 411 to an machine learning engine 412, which in turn, may modify one or more of data generally and the network analysis data in particular when communicating this data via an appropriate SDK.

In some embodiments such as in FIG. 2, the system 100 may also receive data through a data grabber 225. The data grabber 225 may be a high speed data input circuit and may be available to promptly receive and forward data. The data grabber 225 may be useful in receiving and forwarding data regarding self-organizing networks (SON) 215. For example, if a new network site is observed, a SON module may be promptly executed to set up the network site. If there is severe weather, a SON module may be quickly executed to address the likely weather issues. High cell churn may result in another module being executed. Similarly, an outage may indicate another module should be started promptly. The SON 215 data may be fed to the system to assist in troubleshooting or root cause analysis. The system may also take into account machine learning anomalies 217 which may indicate a deeper problem.

The system 100 may also refer to a proprietary databases of previous data and solutions. Each network provider may keep data on root problems, attempted response, successes, failure, time to a response, cost of a response, etc. This data may be useful in determining and refining responses to identified root cause problems. The proprietary data may also be used by the machine learning module 170 to identify root causes.

The system 100 may take a variety of steps once the root causes have been determined and ranked. Some common responses may include (and are limited to) creating and communicating a report, taking a corrective action, creating and communicating an alert and determining and implementing an optimization.

In the embodiments where a correction is attempted, the system may monitor if the correction has occurred. If the correction has not taken place or the results of the correction are not as desired, the system may take additional steps such as creating an alert to a supervisor. In other embodiments, the system may proceed through the determined likely root causes and implement one after the other until all the root cause solutions have been tried and then if none of the solutions are effective, an alert may be created to a supervisor.

In some embodiments, a cost function 311 (FIG. 3) may be part of the system to assess which is the most likely root cause among all the events detected by the correlators. For example, in some instances, the increase in dropped calls in an area may have been caused by detected correlator events like antenna tilt change, a cell being down and a parameter change. Such cost function 311 analyzes the three detected cases and determines the likelihood of each one being the main factor that cause the issue.

The cost function 311 may have a processor, a memory and an input/output circuit such as illustrated in FIG. 4. The processor in the cost function 311 may be physically configured according to an algorithm that determines the appropriate solution in view of the time, cost and labor required. In some embodiments, the algorithm may be improved over time using machine learning to analyze past attempted fixes and the results.

Figure 5:
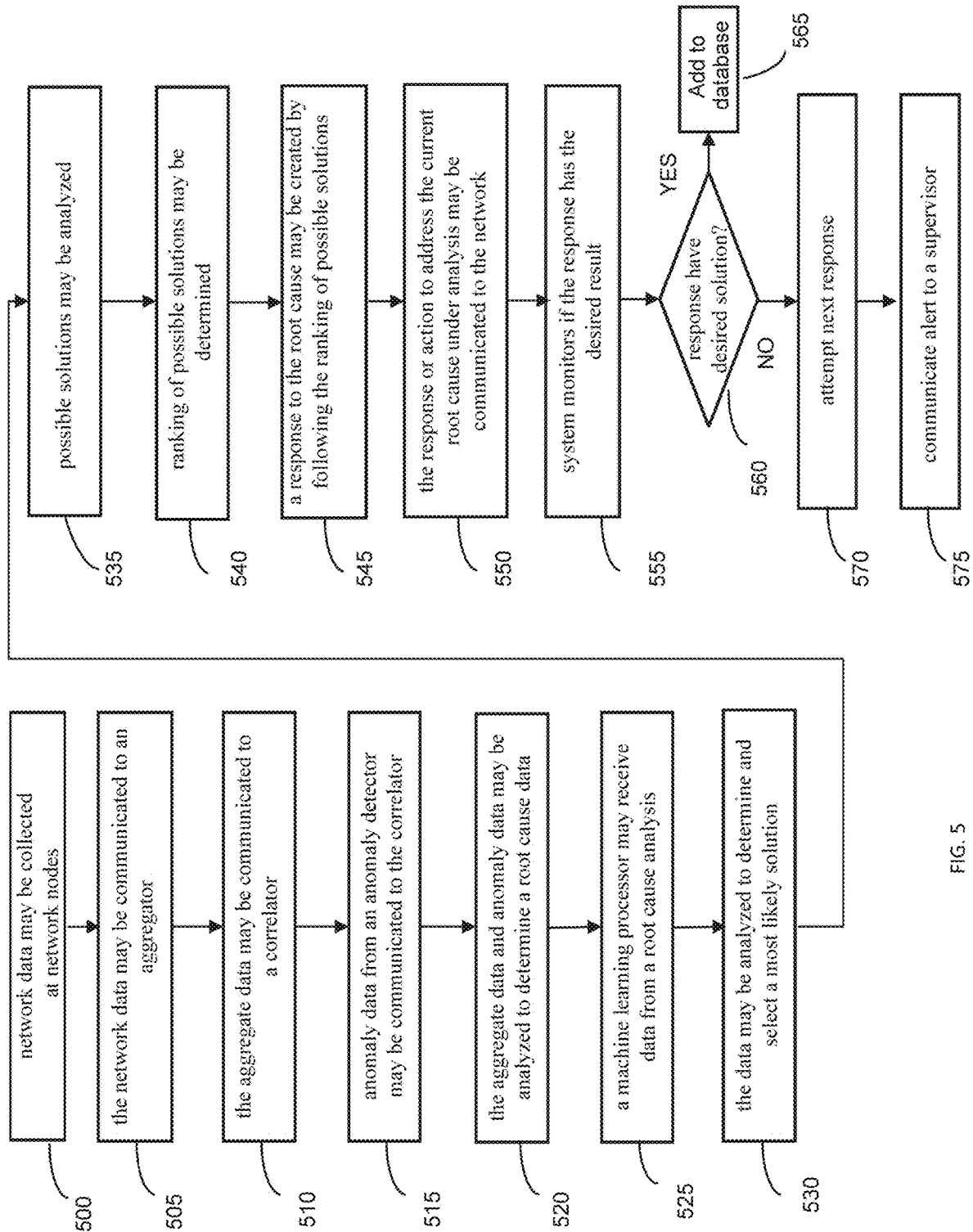
FIG. 5 may be an illustration of a method used by the system.

FIG. 5 may illustrate a method used by the system 100. At block 500, network data may be collected at network nodes 112. The data may take in a variety of aspects of the network. Examples of the data may include whether parameters of elements of the network have changed, whether there have been any network outages identified by the node, whether there have been any neighbor changes noticed by the node, whether there has been any changes in tilt to the node in question or on any neighbor nodes, whether there have been any alarms detected by the node, any from any other data gathering nodes on the network. Some sample illustrations of node data may be illustrated in FIG. 9-11.

At block 505, the network data may be communicated to an aggregator 110. The aggregator 110 may aggregated the network data into aggregate data. In some embodiments, the data may be reviewed for duplicates or for changes that are more recent than older data. The aggregator data 910 may be primarily factual about the status of elements of the network.

At block 510, the aggregate data may be communicated to a correlator 130. The correlator 130 may take in data from the aggregator 110 and analyze it. In an attempt to find conclusions about the cause of identified problems on the network In addition, at block 515, anomaly data from an anomaly detector 140 may be communicated to the correlator 130. The anomaly data may come from an anomaly detector 140 or from other nodes on the network.

At block 520, the aggregate data and anomaly data may be analyzed by the correlator 130 to determine root cause data. In some embodiments, the aggregate data and anomaly data may have been studied previously and the most likely root cause from past experience may be stored in a memory. The aggregate data and anomaly data may be analyzed to determine the most likely caused based on past experience.

At block 525, a machine learning processor 170 may receive data from the root cause analysis performed in the correlator 130. The data may include the root cause data from the correlator 130, configuration data from a configuration management watchdog 160 and data from a network watchdog 150. The machine learning 170 may be used to improve the identified causes of network problems over time. By studying large amounts of data over time, the ability to identify likely causes may be improved by using machine learning 170 to study the problems and solutions.

At block 530, the data may be analyzed to determine and select a most likely solution from a plurality of solutions based on past problems and previous solutions. The machine learning 170 may improve the identification of problems and solutions. Further, the machine learning 170 may be able to see problems and solutions in a different way.

At block 535, in a root cause analysis operator or evaluator 311 (FIG. 4), possible solutions may be analyzed. Some solutions may be more relevant for the event The analysis 311 may take into account the correlator event type and radio frequency analysis of the various solutions and outputs 317 and may take into the need created by the problem. For example, it a problem has created a total outage, a more aggressive solution may be given a heavier weight. If a problem is more of an annoyance, a less aggressive solution may be given a heavier weight.

At block 540, a ranking of possible solutions may be determined. As mentioned earlier, the level of the problem may affect the weight given to the various solutions. For example, a critical problem may allow responses that are expensive but will work quickly may be ranked higher. Similarly, a minor problem may allow for responses that take longer time and cost less.

At block 545, a response to the root cause may be created by following the ranking of possible solutions. As mentioned previously, the root cause analysis attempts to determine the cause of a problem on the network. However, finding a specific, single cause may be a challenge. There may be instances where more than one cause may be determined as being a possible root cause. Thus, the causes may be ranked in probability order 325 of being most likely to be the root cause. Logically, each root cause may have more than one solution or responses and the solutions/responses may be ranked according to the likelihood of success.

The solutions/responses may be further refined using machine learning 170 to review past root causes and proposed solutions. By observing which solutions worked for the root cause, the best solutions based on past performance may be determined. Logically, the best performing response/solution may change over time as the network may change. For example, a response/solution for a 3G system may not be appropriate for a 5G system. Possible solutions may include optimizations 319, alerts 321, root cause analysis refinements 323, creating a probability list of solutions 325 and actions to address the root cause 327. In addition, the possible solutions may vary over time and over dates as some times and dates may be less busy while other times and dates may be very busy making a solution more imperative.

At block 550, the response or action 327 to address the current root cause under analysis may be communicated to the network. As mentioned previously, the response 327 may take on a variety of forms from adjusting antenna tilt to changing a configuration. The response may follow a protocol and may be encrypted for security before it is communicated.

In some embodiments, additional machinery such as purpose built robots 1400 (FIG. 14) may be part of the response or action that may be a solution. For example, an antenna may be jammed in a non optimal direction. A robot 1400 may be programmed to position itself, grab the antenna and use force to adjust the antenna. The robot 1400 may also have image sensors that may be used to identify the cause of the problem. The robot 1400 may also have force sensors that may recognize when the force is too great and may damage the antenna. Other robots 1400 may be used in a similar manner. For example, if a power supply in a server has failed, the robot 1400 may recognize a series of steps that may be taken to fix the problem. As one example, the steps may include obtaining a new power supply from storage, obtaining the tools necessary to open the server, moving to the server, turning off power to the server, removing the server case, removing the broken power supply, replacing the case, turning on power to the server, testing the server and recycling the failed power supply. The robot 1400 may also communicate a message that the failed power supply is ready to be recycled and that a new spare power supply should be ordered for the inventory. Thus, the robot 1400 may communicate with a variety of systems such as inventory, accounting, scheduling, maintenance, error logs and best practices database.

The robots 1400 may be designed for a generic task or may be purpose designed for a specific task. The robots 1400 may have a variety of tools and access to additional tools. The robots 1400 may have interchangeable tools, arms, legs, tracks or other climbing and grabbing tools. The robots may have a power source 1410, a processor 1420, a memory 1430, an input output circuit 1450, an antenna 1440, a vision device (no shown), along with motors to drive a variety of mechanical devices 1460 such as tools to perform tasks. The parts of the robots 1400 may be interchangeable and may perform a variety of functions.

The robots 1400 may have stored solutions to known problems, may have access to stored solutions or may have partial solutions and may learn solutions by piecing together a plurality of known solutions to create a new solution. For example, a server may have a hard drive error. The process to open the server may be the same as when open the server to replace a power supply. Thus, the solution of opening the server to replace the power supply may be used as part of a procedure to open the server and replace a hard drive. In additional embodiments, the robot 1400 may observe a worker manually correct a problem, translate the worker's actions into actions performable by the robot and storing the sequence in a library.

The robot 1400 may also query other equipment to see if similar problems have been faced, how the problems were fixed and what tools may be needed to implement that fix on the problem at hand. The information may be stored in a central database or may be distributed across a network of nodes. The various solutions may be reviewed to find the optimal solution to a repeat problem. The problem and solution may be pushed to other nodes or may be available upon being queried. The robots 1400 may be in separate locations or the same location.

At block 555, the system 100 may monitor if the response has the desired result. For example, if there are a number of dropped calls identified as the problem, the result of the root cause analysis should result in less dropped calls. At block 560, a decision may be made whether the response had the desired result. If the response had the desired result, at block 565, the response may be added to a database for future reference and the method may end.

If the response does not have the desired result, at block 570, additional responses may be attempted. As mentioned previously, the possible responses may be ranked from most likely to least likely. The system may iterate through the possible solutions until all the solutions have been tried or until one has the desired results. For example, the second ranked solution may fix the problem and the system may stop as there is no need for future solutions.

At block 575, if the response does not have the desired result an alert 321 may be communicated to a supervisor. The alert 321 may take on a variety of forms. In some embodiments, the alert may be an email or communication to a supervisor. In other embodiments, the communication may be an alert to another software or hardware system that the problem should be given greater importance.

FIG. 8 may illustrate an example of a user interface that may be generated by the system 100. If the dropped call rate (DCR) has increase, a cell responsible for the dropped calls may be identified 805. The root cause analysis may be listed 810 and a further description may be given describing the root cause analysis system 815. An action may be listed 820 that was taken to address the problem and an indication 825 may be given whether the action was taken. If the action was an auto correcting action 830, it may be noted. If an alert was necessary 835, it may also be noted. Finally, other possible actions 840 may be available to be selected.

FIGS. 9-12 may illustrate the readings and logic of some sample nodes. At a high level, the nodes may collect data about aspects of the network and report that data to the aggregator 110. Similarly, the nodes may have logic that may be communicated to the correlator nodes 120.

FIG. 9 may show a sample node reading for a neighbor down (intra). Data sources may include a reading on cell availability and neighbor handover attempts. The logic which may be communicated to the correlator 120 may include the results of an analysis of the neighbor handoff attempts.

FIG. 10 may show a sample node reading for a neighbor down (inter). Data sources 1020 may include a reading on cell availability and neighbor handover attempts. The logic 1010 which may be communicated to the correlator 120 may include the results of an analysis of the neighbor handoff attempts.

FIG. 11 may show a sample node reading when a cell is down. The data to the aggregators is a relatively simple report of the cell availability. The data to the correlator may analyze 1120 whether the cell has been down for greater than 90 percent of the time by reviewing the data sources 1110 of cell availability.

FIG. 12 may illustrate how cell performance may change when a problem is faced and addressed. As may be seen, confidence 1210 of a root cause 1220 may be determined along with the description 1230 and appropriate action 1240 in response. The user interface may indicate whether the action ran 1250, whether it was an auto correct action 1260, whether the action was validated 1270 and whether an alert was sent 1280 and whether additional steps need to be taken 1290.

FIG. 13 may illustrate a user interface that may allow numerous problems and corrective actions to be reviewed. The various problems may be in categories 1310 which may be expanded 1320 and the various descriptions and actions may be reviewed. In addition, the automatic responses may be reviewed.

Figure 14:
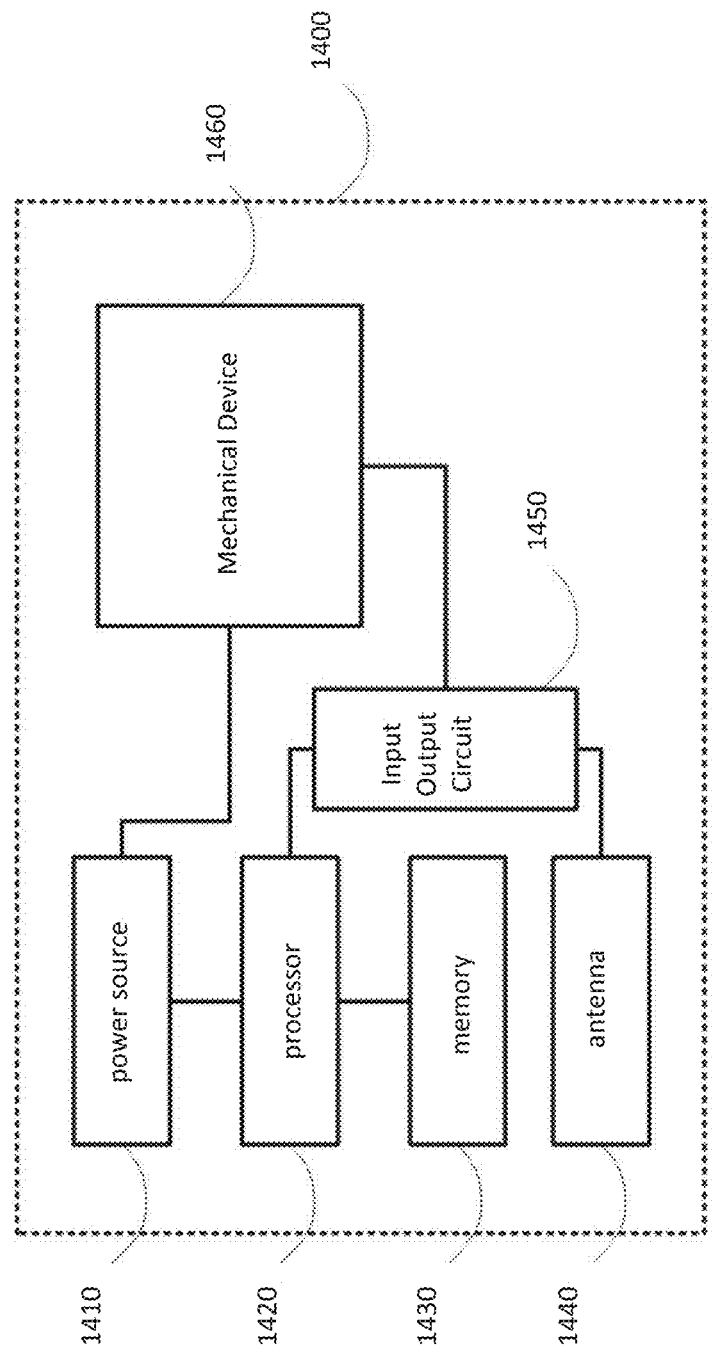
FIG. 14 may be an illustration of the computing elements in a robot used by the system.

As illustrated in FIG. 14, the robot 1400 may include a power source 1410, a processor 1420, a memory 1430, an antenna 1440 and input output circuit 1450 and a mechanical device 1460. The power source 1410 may be a battery, a capacitor, a solar cell, a wireless power source that may be awoken when in range of a wireless power source or a combination of all of these power sources. The processor 1420 may be a purpose built processor designed to minimize power use to conserve battery light. In addition, the capabilities of the processor 1420 may be adapted to work with the mechanical device 1460 in the robot 1400 as the mechanical device 1460 may purpose built also.

FIG. 4 may be a sample computing device used by the system 100. The various servers and computing devices described herein may have a similar design but the servers may be modified to specifically excel at the services provided. The computing device 901 may include a processor 902 that may be coupled to an interconnection bus. The processor 902 may include a register set or register space 904, which is depicted in FIG. 4 as being entirely on-chip, but which may alternatively be located entirely or partially off-chip and directly coupled to the processor 902 via dedicated electrical connections and/or via the interconnection bus. The processor 902 may be any suitable processor, processing unit or microprocessor. Although not shown in FIG. 4, the computing device 901 may be a multi-processor device and, thus, may include one or more additional processors that are identical or similar to the processor 902 and that are communicatively coupled to the interconnection bus.

The processor 902 of FIG. 4 may be coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 may perform functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method may be implemented in hardware, firmware, and/or software. In one embodiment, program modules and routines are stored in mass storage memory 914, loaded into system memory 912, and executed by a processor 902 or may be provided from computer program products that are stored in tangible computer-readable storage mediums (e.g. RAM, hard disk, optical/magnetic media, etc.).

The peripheral I/O controller 910 may perform functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 4 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including machine learning software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

Figure 7:
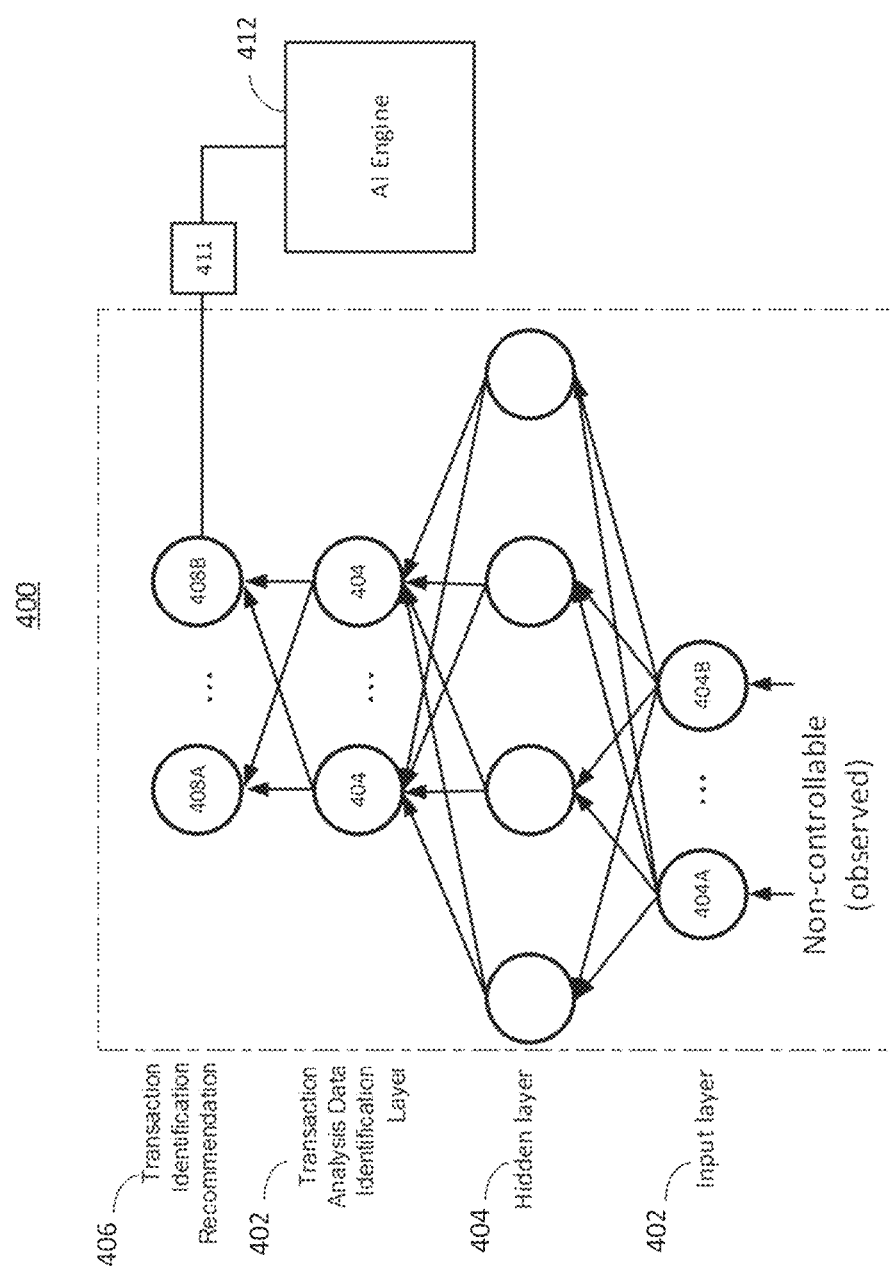
FIG. 7 may be another illustration of machine learning architecture.

The system 900 may include but is not limited to any combination of a LAN, a MAN, a WAN, a mobile, a wired or wireless network, a private network, or a virtual private network. Moreover, while only one remote computing device 930 is illustrated in FIG. 7 to simplify and clarify the description, it is understood that any number of client computers are supported and may be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein.

As a result of the system, several technical problems may be addressed with technical solutions. In one aspect, the design of the system 100 is modular so one part of the system 100 may be adjusted while the rest of the system 100 may continue to operate. Further, solutions to network problems may now be automatically identified through analysis including machine learning and future problems may be automatically addressed through technical solutions which have been ranked on the likelihood of being successful. Further, GUIs may be created to illustrate the system attempting to fix itself. In addition, protocols and APIs may be used to ensure network data and network solutions are systematically shared in a consistent manner across the system 100.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for root cause analysis of cellular network failures comprising:
  an aggregator which receives data on network anomalies from at least one self-organizing network (SON) node;
  a correlator which receives data on network issues from a group comprising:
    an aggregator; and
    an anomaly detector;
  a machine learning processor which receives network status data from a group comprising:
    the correlator;
    a configuration management watchdog; and
    a network watchdog;
    wherein the machine learning processor is physically configured to analyze the network status data to determine a possible root cause and most likely causes or solutions from a plurality of possible solutions based on past problems and previous solutions; and
  a root cause analysis operator in communication with the machine learning processor comprising a root cause processor physically configured to analyze the possible root cause, determine a ranking of possible solutions according to a ranking algorithm, wherein the ranking represents radio frequency analysis of the possible solutions, and create a response selected from at least one of the following:
    report;
    actions;
    alerts; and
    optimization.

2. The system of claim 1 further comprising a cost optimizer which reviews the response from the root cause analysis operator and determines at least one of response to be selected.

3. The system of claim 1, wherein the SON nodes comprise root cause analysis elements in communication with the cellular network, which track their status and report their status to an aggregator.

4. The system of claim 1, wherein the aggregator receives data from the SON nodes wherein the data comprises at least one from the group comprising:
  parameter changes;
  neighbor changes;
  tilt changes;
  current parameters;
  current neighbors; and
  changes on neighbors.

5. The system of claim 1, wherein proprietary databases of previous data and solutions are used to further train a machine learning system.

6. The system of claim 5, wherein the machine learning system selects a correction for a problem and validates the correction occurred.

7. The system of claim 6, wherein if the system cannot validate the correction has occurred, the system communicates alerts to supervisors.

8. The system of claim 1, further comprising a mechanical device which is adapted to implement solutions to implement the action identified as the response.

9. A method for root cause analysis of cellular network failures comprising:
  collecting network data at self-organizing network (SON) nodes;
  communicating the network data to an aggregator where the network data is aggregated into aggregate data;
  communicating the aggregate data to a correlator;
  communicating anomaly data to the correlator;
  analyzing the aggregate data and the anomaly data to determine root cause data;
  receiving at a machine learning processor network status data wherein network status data comprises:
    the root cause data;
    configuration data from a configuration management watchdog; and
    network watchdog data;
  analyzing the network status data to determine a possible root cause and most likely solutions from a plurality of solutions based on past problems and previous solutions;
  analyzing in a root cause analysis operator possible solutions from the mostly likely solutions;
  determining a ranking of the possible solutions according to a ranking algorithm wherein the ranking represents radio frequency analysis of the possible solutions;
  creating a response to the possible root cause by following the ranking of possible solutions;
  communicating the response to the network; and
  monitoring if the response has a desired result;
  if the response does not have the desired result, selecting a subsequent response; and
  if the subsequent response does not have the desired result, communicating an alert to a supervisor.

10. The method of claim 9, further comprising
determining a ranking of responses according to impact on the network; and
implementing the responses in order of the determined ranking.

11. The method of claim 10, wherein the responses are communicated to a task manager.

12. The method of claim 10, wherein responses are selected from a group comprising:
a report;
actions;
alerts; and
optimization steps.

13. The method of claim 9, further comprising:
using a machine learning system to analyze past problems and solutions; and
improving problem response and solutions based on the machine learning system.

14. The method of claim 9, further comprising implementing a mechanical device which is adapted to implement solutions to implement the action identified as the response.

15. A tangible computer readable medium comprising computer executable instructions for executing a root cause analysis of cellular network failures comprising instructions for:
collecting network data at self-organizing network (SON) nodes;
communicating the network data to an aggregator where the network data is aggregated into aggregate data;
communicating the aggregate data to a correlator;
communicating anomaly data to the correlator;
analyzing the aggregate data and anomaly data to determine root cause data;
receiving at a machine learning processor network status data wherein network status data comprises:
the root cause data;
configuration data from a configuration management watchdog; and
a network watchdog;
analyzing the network status data to determine and select a most likely solution from a plurality of solutions based on past problems and previous solutions;
analyzing in a root cause analysis operator possible solutions;
determining a ranking of the possible solutions according to a ranking algorithm wherein the ranking represents radio frequency analysis of the possible solutions;
creating a response to the possible root cause by following the ranking of possible solutions;
communicating the response to the network; and
monitoring if the response has a desired result;
if the response does not have the desired result, selecting a subsequent response; and
if the subsequent response does not have the desired result, communicating an alert to a supervisor.

16. The tangible computer readable medium of claim 14, further comprising:
determining a ranking of a response according to a ranking algorithm, wherein the ranking represents a monetary cost, an amount of time for the response to occur and an amount of labor to implement the response; and
implementing the responses in order of the determined ranking.

17. The tangible computer readable medium of claim 15, wherein the responses are communicated to a task manager.

18. The tangible computer readable medium of claim 15, wherein responses are selected from a group comprising:
a report;
actions;
alerts; and
optimization steps.

19. The tangible computer readable medium of claim 15, further comprising:
using an machine learning system to analyze past problems and solutions; and
improving problem response and solutions based on the machine learning analysis.

20. The tangible computer readable medium of claim 15, further comprising instructing a mechanical device which is adapted to implement solutions to implement the action identified as the response.

* * * * *